United States Patent Office

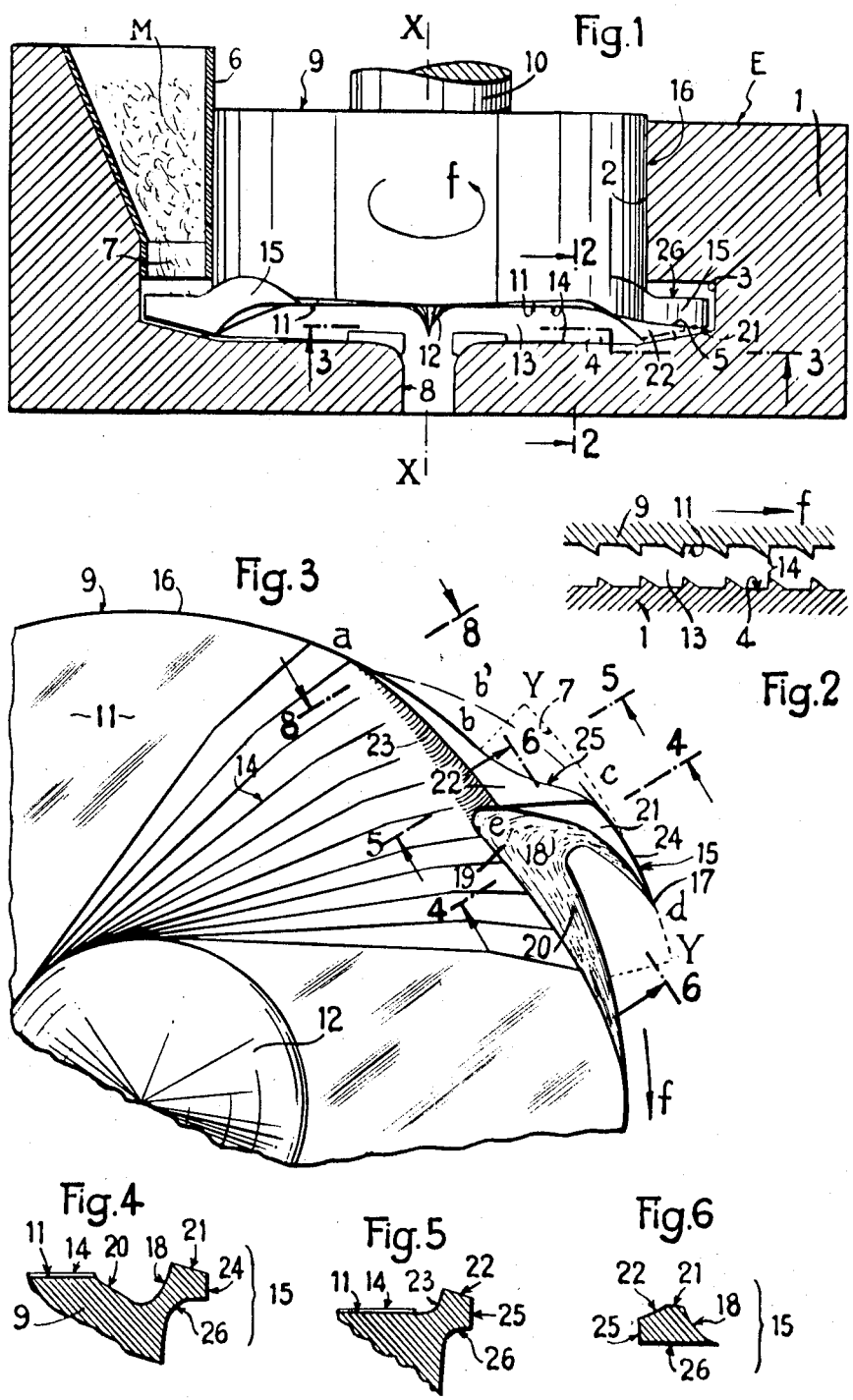

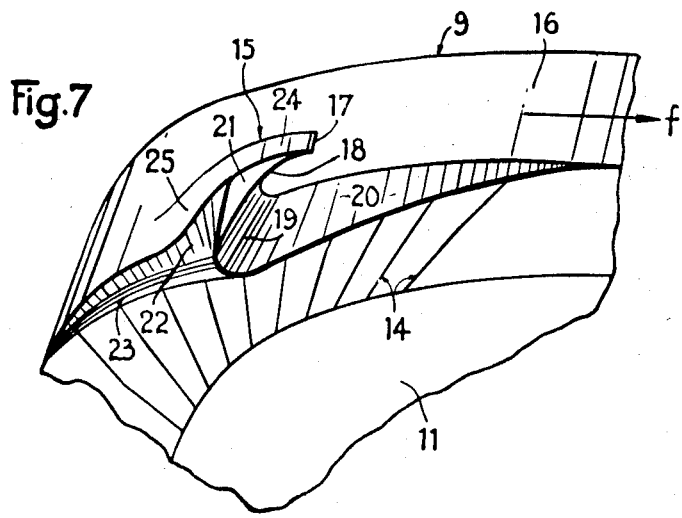
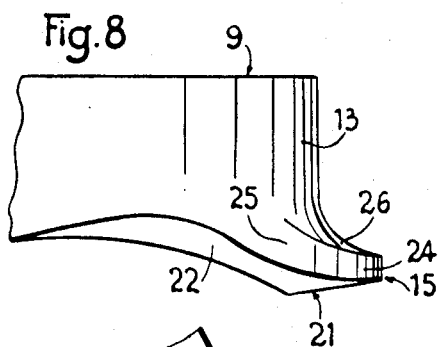
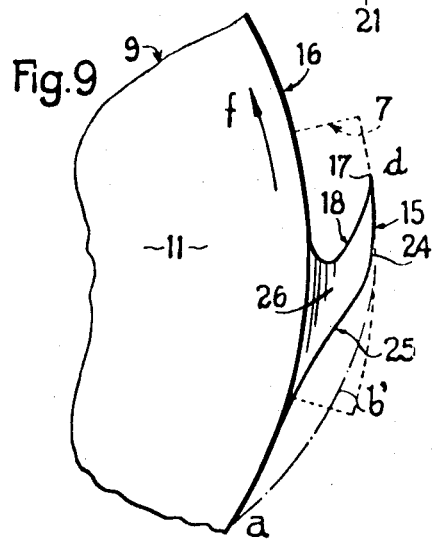
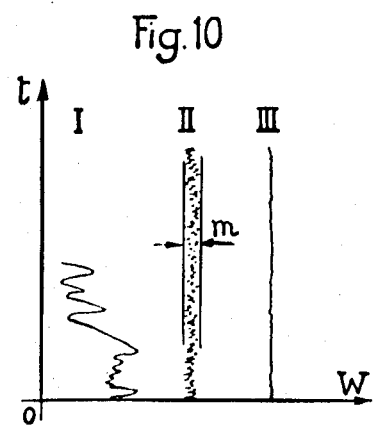

3,605,186
Patented Sept. 20, 1971

3,605,186
PLATE EXTRUDER WITH IMPROVED FEED MEMBERS
Claude Wagner, Pont-a-Mousson, France, assignor to Societe Sidel, Le Havre, France
Filed Mar. 13, 1970, Ser. No. 19,288
Claims priority, application France, Mar. 21, 1969, 8,264
Int. Cl. B29f 3/01
U.S. Cl. 18—12C                                           8 Claims

ABSTRACT OF THE DISCLOSURE

A plate extruder having a stator and a rotor mounted for rotational movement about a common axis and in spaced parallel relation with the stator to provide a gap in between with a feed inlet communicating with a peripheral portion of the stator and rotor and an extrusion die opening through an axial portion of the rotor, one or more teeth extending radially outwardly from the periphery of the rotor for positive displacement of plastic or rubber-like material from the feed opening into and through the gap between the plates to the extrusion die opening.

---

This invention relates to a plate extruder formed of a rotor and stator in substantially spaced parallel relation with a gap therebetween filled with plastic or elastomeric material during flow from a feed in the periphery to an extrusion outlet in the axial portion responsive to rotational movement of the rotor relative the stator.

The invention relates particularly to extruders of the type described formed of plates having a shearing effect on the material and intended to process plastic or elastomeric materials and particularly the extrusion of rigid polyvinyl chloride.

A recent improvement in the surface of the plates consists in lining the active surfaces of the plates with abutments intended effectively to anchor the thin cake of material to be plasticized during passage through the gap. These abutments have provided a noticeable increase in the throughput of the extruder.

As a consequence of this increase in the flow rate, the feed flow of the material to be extruded has become insufficient notwithstanding the presence on the periphery of the rotating plate or rotor of deflecting blades adapted to force the material into the space or gap between both plates forming respectively the stator and rotor.

These deflecting blades, which extend outwardly from the peripheral surface of the rotor, are in the form of more or less radial teeth or massive hooks, the abrupt edges of which are directed towards the front part, in the direction of rotation of the rotor. In extruders equipped with such teeth, it has been established that some defects occur in feed and more particularly in a rapid gelling of the material on the periphery of the plates, especially in the feed zone. This gelling causes clogging of the extruder feed opening.

It is an object of this invention to produce an extruder of the type described which avoids many of the disadvantages previously described and properly increases the extrusion throughput by more appropriate shapes or contours of the teeth or hooks.

These and other objects of this invention will hereinafter appear, and for purposes of illustration, but not of limitation, an embodiment of the invention is shown in the accompanying drawings in which—

FIG. 1 is a sectional elevational view of an extruder embodying the features of this invention;

FIG. 2 is a sectional view taken substantially along the line 2—2 of FIG. 1 and illustrates the abutments on the surface of the plates;

FIG. 3 is a sectional view taken along the line 3—3 of FIG. 1 showing the rotor face oriented towards the fixed plate, but on an enlarged scale;

FIG. 4 is a sectional view taken along the line 4—4 of FIG. 3;

FIG. 5 is a sectional view taken along the line 5—5 of FIG. 3;

FIG. 6 is a sectional view taken along the line 6—6 of FIG. 3;

FIG. 7 is a perspective view of a section of the rotor front face and of one of its teeth;

FIG. 8 is a side elevational view of a portion of the rotor and one of the teeth taken along the line 8—8 of FIG. 3;

FIG. 9 is a plan view showing the back face of one of the rotor teeth;

Figure 11:
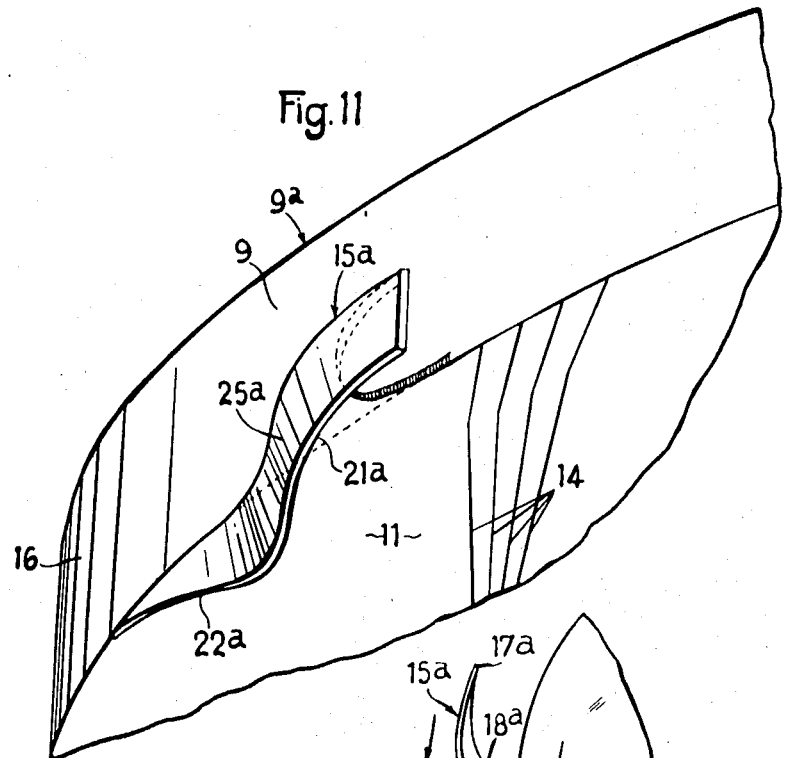
Figure 12:
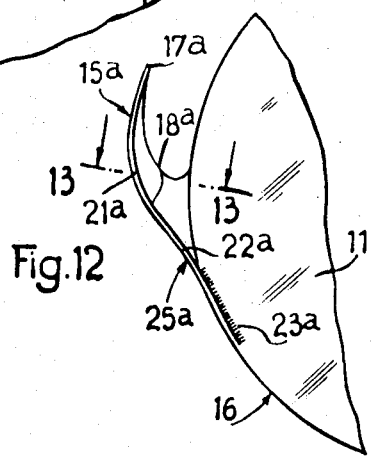
Figure 13:
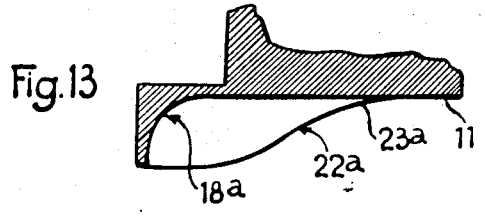

FIG. 10 is a comparative working diagram of two extruders of the prior art, represented by lines I and II, and an extruder embodying the features of this invention, represented by line III, the diagram having as ordinates the power variations W as measured on the rotor as a function of $t$, as the abscissae, FIG. 11 is a perspective view of the front face of a rotor showing a variation in the contour of the teeth;

FIG. 12 is a partial end view along the front face of the plate and one of the teeth; and FIG. 13 is a sectional view taken along the line 13—13 of FIG. 12.

It is a further object of this invention to provide an extruder with plates in which the rotor is provided at its periphery with teeth or hooks characterized by the fact that each tooth is thinned in such a manner that, when viewed parallel to the axis of rotation of the rotor, its profile is in the shape of a snake-venom fang, this profile being inclined tangentially to a circumference concentric with the external cylindrical surface of the rotor and joined to the rotor by wide concave recesses, whereas the tapered end of said profile is defined by an external curve nearly concentric with the cylindrical surface and an internal curve which, under an angle of some degrees, rejoins the external curve at the end of the tooth.

In other words, the profile of each tooth is such that the frontal face of the tooth oriented towards the fixed plate of the stator has a narrow width which is nearly constant in the middle of the tooth, thins progressively towards the end of the tooth, and enlarges progressively while hollowing towards the root of the tooth as it joins the frontal face of the rotor.

Tests have shown that, owing to the shape of the rotor teeth, the gap is steadily and completely filled with plastic displaced centrifugally towards the extrusion dye, thus insuring full throughput and constant operation of the extruder.

Referring now to the drawings, FIGS. 1 to 9 represent an extruder E having (FIG. 1) a body 1 in the form of a cylindrical cup-shaped member with a vertical axis X—X forming the stator. The body comprises a cylindrical housing 2 enlarged at its base 3 immediately above the bottom of the cup. The bottom is plane in the part 4 located below the housing 3 and in the shape of a truncated cone 5 which diverges towards the top below the enlargement 3.

A feed hopper 6 is mounted in the wall of the body 1 for feeding material M to be extruded. This hopper is fixed in such a manner that the material introduced flows in a direction parallel to the axis X—X and debouches through an aperture 7 facing the periphery 5 of the bottom of the stator 1, at a certain distance from the latter. The aperture 7 is as wide as possible. In the center of the bottom of the stator 1 there is provided an axial aperture 8 which constitutes the extrusion die and which is bell-shaped at its inlet to facilitate the passage of the material extruded therein.

In the cylindrical cavity 2 of the body 1, a rotor 9 is mounted for rotational movement in the direction of the arrow by means of a driving motor (not shown) in operative engagement with a rotor shaft 10 having its axis X—X. In the center of the frontal face 11, in position to face the die 8, the rotor 9 has an axial tip or abutment 12 having a concave bell shape which somewhat conforms to the bell-shaped entrance portion of the extrusion die opening to facilitate the flow of the material towards the die.

The stator 1 and the rotor 9 are generally in the form of plates, the opposite active substantially parallel faces 4 and 11 of which are separated by a spacing or gap 13 (FIGS. 1 and 2).

As shown, these active surfaces 4 and 11 are covered with abutments 14 which extend outwardly for a distance across the width of the gap 13 (FIG. 2) so that a significant clearance space will remain between the crests of the abutments of the stator and of the face of the rotor. By way of example, the abutments may be in the form of continuous spirals extending outwardly from the respective surfaces of the stator and rotor in the manner of pump impellers with the striations extending substantially from the center of the stator or of the rotor to the peripheral portion thereof (FIG. 3). Such abutments are intended to effect a gripping action with the thin cake of plastic material to be extruded with a view towards anchoring the material at the surfaces of the plates whereby the material between the plates is subjected to a shearing action.

The rotor 9 is completed by teeth or hooks 15 extending radially outwardly from the periphery of the cylindrical surface 16 of the rotor and with regard to the front face 11. As shown, each tooth or hook 15 extends outwardly a considerable distance with reference to the rotor 5 and is curved towards the front in the direction of rotation of the rotor (arrow f) in such a manner that in FIG. 1 the hook represented on the right is seen from the back side whereas that represented on the left is seen from the front. These hooks are shown schematically in FIG. 1 and for details of their shapes, reference can be made to FIGS. 3 to 9.

According to the invention, each tooth or hook 15 is thinned in such a manner that when one observes the rotor from an end, or parallel to the axis X—X and by its active face (FIG. 3), the profile abcde is in the shape of a long S corresponding approximately to that of a snake-venom hook. This minute profile, the tapered end of which corresponds to an edge 17 parallel with the generatrix of the surface 16 of the rotor body, is inclined tangentially to a circumference Y—Y concentric with the external cylindrical surface 16 of the rotor. This portion of the profile is formed between the outside curve $cd$ which is tangent at $d$ to the circumference Y—Y and the inside curve $de$ which extends almost tagnetially to the outside curve at the top $d$ of the tooth and consequently forms a sharp acute angle therewith. The large base of the profile is joined to the circular profile of the rotor by a wide concave recessed portion $cb$ with the part $ba$ of the external outline of the profile merging with the circular profile of the cylindrical surface 16.

Consequently, this profile has a width which increases progressively at first from the end 17 of the tooth and then has a nearly constant width in the entire median portion of the tooth and then finally widens in the heel portion of the tooth, but remains distinctly of lesser width than hooks or teeth of known plates, the external outlines of the profile of which is represented by the broken line $ab'd$ in FIGS. 3 and 9, wherein the feed orifice is represented by the outline 7.

Moreover, when one considers the different faces of the tooth, the latter is defined by:

A front side 18 which first engages the material to be extruded; beginning with the end edge 17 which slopes slightly with regard to the circumference Y—Y, the edge is concave and forms a deflector which continues on the base side of the tooth with a surface forming a very concave recess, and then continues as a bevel 20 cut into the cylindrical body of the rotor, the set of the surfaces 18, 19 and 20 forming a sort of plough-share or plough-overfall;

A tapered frontal face 21 which forms a curvilinear triangle between the curves $cd$ and $ed$; this frontal face 21 is planar or preferably in the shape of a truncated cone in order to correspond shapewise to the peripheral surface 5 of the stator bottom from which it is separated by a very small space (FIG. 1);

A frontal face of a concave heel 22, joined with the preceding as shown in line $ce$ and also joined as shown in line $ea$ with a concave surface 23 having a slope avoiding the overpouring and which merges with the frontal surface 11 of the rotor;

A tapered convex cylindrical external surface 24, the intersection of which with the front side 18 forms the end edge 17 and the profile which corresponds to the curve $cd$;

A heel concave cylindrical external surface 25, the profile of which corresponds to the recess $cb$;

And a back side face 26 defined by the intersection curves with the driving face 18 and the outside faces 24 and 25.

Briefly, the tooth is widely recessed and very sharply curved to extend circumferentially. Its frontal surface 21 has a width which is as narrow as possible, decreasing progressively towards the end of the tooth and on the base of the tooth it is followed by a recess formed by the concave face 22. The driving face 18 is characterized by its plough-share shape and is recessed and extended by the concave surface 23.

The operation is as follows:

The rotor 9 is driven rotationally in the direction of the arrow $f$ by means of the shaft connected with a suitable drive means. The material M to be extruded, such as rigid polyvinyl chloride, in granular or powder form, is introduced into the gap 13 from the feed hopper 6. The stator 1 and the rotor 9 are heated, as by well known or conventional means such as by electrical resistance heaters, or by the passage of heat exchange fluids or oils through channels within the elements. Thus the material is softened by the heat and anchored by the abutments 14 whereby the material is subjected to a shearing action while in the gap and from which it emerges in the extruded state through the die 8.

The teeth or hooks 15 operate in the following manner:

Owing to their front side 18, the teeth shovel the plastic material into the gap 13 between the rotor and stator. During rotation, the material defiles under the aperture 7 of the hopper 6 which tends partially to close (FIGS. 3 and 9). Due to the recessed peripheral face formed by the concave surface 25 and because of the relatively thin profile in the snake-fang shape, the teeth 15 obstruct only a small fraction of the aperture of the section 7 of the hopper. As a result, the aperture 7 remains relieved so that between two consecutive teeth arranged to extend outwardly radially from circumferentially spaced apart portions of the rotor, the plastic can flow easily into position to be entrained by the driving face 18 of the oncoming tooth.

Owing to the plough-share shape of the driving face 18 and of the trailing faces 19 and 20, the plastic material received under the feed orifice 7 is displaced from the periphery towards the interior of the gap 13 where it is entrained.

Owing to the fact that the peripheral end of the front side 18 is nearly parallel with the external cylindrical surface of the rotor, the plastic material is prevented from accumulation in avorte or the periphery of the gap 13, or in the peripheral ring-shaped cavity 3 of the stator 1, under the effect of the centrifugal force. On the contrary, the plastic material is displaced towards the interior of the gap. The detrimental centrifugal effect is thus substantially effectively neutralized.

The frontal face 21 of each tooth, which is nearest to the active face of the stator 1, is almost in contact therewith. As the area of this frontal face 21 is reduced to a minimal value by the concave sloping surface 22, the gelling phenomenon of the plastic, which occurs usually between the frontal face and the active face of the stator, is reduced to a minimum so that the risk of clogging of the aperture 7 of the hopper 6 with gelled plastic material is practically suppressed.

Finally, the concave surface 23 or anti-overpouring slope, which extends the deflection face 18 and joins the root of the tooth with the active frontal face 11 of the rotor, prevents the material entrained by the front side 18 from flowing back towards the back side of the tooth. Because of the sloping effect, it maintains the plastic material on the inside of the gap 13.

Consequently it will be seen that each detail of the shape of the teeth 15 contributes to the proper feeding of the extruder.

It is the snake-fang form having a width which is as thin as possible and the combination of the various faces described in each tooth which, by the suitable recessing of the tooth, insures a desirable entrainment of the plastic material for positive displacement from the feed orifice 7 toward the gap 13 without clogging at the site of the aperture.

It is the face 18 or its role as a plough-share and its anti-centrifugal effect of the peripheral portion; the concave surface 25 and its role of disengagement of the passage section of the aperture 7; the concave surface 18 by its antipouring slope which maintains the material on the inside of the gap; the concave surface 22 owing to its concavity; and the surfae 21 which permits a void space and allows the reduction of friction with the plastic material which insures the feeding and continuous movement of the plastic material from the feed opening to the gap of the extruder.

Due to this combination and to these advantages and by providing for maximal feed orifice section 7, the through-put plastic material is markedly increased, as illustrated by the numeral examples hereinafter set forth in the table which compares the outputs of rigid polyvinyl chloride from two extruders formed with plates having abutments 14 and hooks and with a gap 13 of 7 mm., the temperature of the heating oil or fluid being maintained at about 200° C.

The known extruder A comprises a rotor having three hooks of unrecessed teeth of known types, represented by profile ab'd of FIG. 3, shutting out about 35% of the passage section of the feed orifice 7.

The extruder B, embodying the features of this invention, is formed of a rotor having six recessed hooks 15 clogging only about 20% of the feed section.

TABLE

| | Output in kg./hr. | | Gain, B−A in kg./hr. | Gain, $\frac{B-A}{A} \times 100$ in percent |
|---|---|---|---|---|
| | Extruder A | Extruder B | | |
| Rotor speeds, r.p.m.: | | | | |
| 40 | 20.4 | 26.2 | 5.8 | 28 |
| 60 | 28.9 | 41.2 | 12.3 | 42 |
| 80 | 39.8 | 51.5 | 11.7 | 39 |
| 100 | 50.2 | 63.2 | 13.0 | 25 |
| 120 | 61.6 | 74.5 | 12.9 | 20 |
| 140 | 72 | 99 | 27 | 38 |
| 160 | 84 | 115 | 3 | 37 |

As will be seen, depending upon the rotational speed of the rotor, the gain in output varies between 20% and 40%. It will be noticed that at the highest speeds (140 and 160 r.p.m.) which corresponds to the speed of industrial operation, the gains are high. Still more than the percentage of gain, the fact which is of interest is the maximal output obtained which is above 100 kg. per hour whereas, with extruders having paltes of a known type without abutments on the plates, it was difficult to obtain outputs of 60 kg. per hour and irregular operating conditions were experienced.

Likewise, owing to this invention, the stability of operation is markedly improved to nearly perfect, as illustrated in the diagram of FIG. 10. In this diagram, the axis of the ordinate 0W represents the power measured on the rotor and the axis of the abscissae 0t is the time. Line I represents the operation of a known extruder with massive hooks having an external convex profile ab'd and with the plates free of abutments. Line II represents the operation of another known extruder but improved with respect to the preceding by the fact that the plates are covered with abutments 14, such as shown in FIG. 2. Line III represents the operation of the extruder embodying the features of this invention with the plates covered with abutments 14 and with the curved and recessed teeth 15.

It will be seen that line I indicates high variations in the power amplitude and even a drop in power. The operation is particularly unstable due to slippage between the thin cake of plastic material and the surfaces of the plates. Line II shows improved stability of operation with an amplitude m of the power oscillation. This great regularity is due to the improved anchorage of the thin cake of plastic material by the abutments 14 of the plates.

Line III shows still better power stability with very small oscillations in power due to the total and constant filling of the gap 13 by the curved and recessed teeth 15.

FIGS. 11 to 13 represent a variation in an embodiment of the invention wherein the teeth or hooks of the rotor 9a are massive. The hooks are in the form of spoons 15a with thin walls. In cross section, they are corner-shaped (FIG. 13), the internal surface of which is suitably curved. Owing to this corner-shaped section, the teeth 15 have sufficient rigidity. As previously described, a front side 18, which initially contacts the plastic, is in the shape of a plough-share ending at the external edge 17a with a concave face nearly parallel to the peripheral cylindrical surface of the rotor in order to oppose the centrifugal effect. They comprise also a concave surface 23a joining the active face 11 of the rotor and functioning as a slope in order to maintain the plastic material on the inside of the gap. Surface 22a of the frontal surface 21a merges with the active surface 11 of the rotor. This surface 22a takes only a secondary part by reason of the small contact between the lateral face 21a with the active face of the stator and consequently the absence of risk of gelling resulting from the friction of the plastic material between the active face of the stator and the frontal face 21a.

It will be understood that the invention is in no way limited to the methods of processing illustrated and described and which have been given by way of examples. For example, the invention is applicable to extruders with plates operating for rotation about a horizontal axis.

The invention is also applicable to extruders in which feed direction at the periphery of the gap is parallel to or oblique to the plates, instead of being parallel to the axis X—X of the plates, as in the described examples.

Finally, the invention is applicable to extruders which make use of a mechanical feed instead of relying solely on gravitational feed.

It will be understood that other changes may be made in the details of construction, arrangement and operation without departing from the spirit of the invention, especially as defined in the following claims.

I claim:

1. A plate extruder having one fixed plate as a stator and another plate in the form of a rotor mounted for rotational movement about a common axis in spaced parallel relation with the stator to provide a gap therebetween, a feed inlet communicating with a peripheral portion of the gap between the stator and rotor and an extrusion die opening through an axial portion of the rotor, the improvement comprising one or more teeth in the form of hook members extending radially outwardly from the periphery of the rotor, said teeth being tapered such that when viewed from a direction parallel with the axis of the rotation of the rotor, the profile has the contour of a snake-venom fang, said profile leaning tangentially to a circumference concentric with the external cylindrical surface of the rotor and joined thereto by a wide concave recessed portion, the tapered end of said profile being defined by an external curve almost concentric with the cylindrical surface and an internal curve which rejoins the external curve at an angle at the end of the tooth.

2. A plate extruder as claimed in claim 1 characterized by the fact that the frontal face of the profile of the tooth which is oriented towards the stator has a narrow width which is nearly constant through the intermediate portion of the tooth, narrows progressively towards the end of the tooth and enlarges progressively while being hollowed towards the root of the tooth as it joins the frontal face of the rotor.

3. A plate extruder as claimed in claim 1 characterized by the fact that each tooth has a profile in the shape of a long S.

4. A plate extruder as claimed in claim 3 in which the S-shaped profile is determined by a peripheral convex surface of the tooth joined with the peripheral cylindrical surface of the rotor by a concave surface.

5. A plate extruder as claimed in claim 1 in which each tooth is connected to the rotor plate by a concave face in the shape of a plough-share which is extended towards the end of the tooth by a deflection portion which is nearly parallel to the peripheral cylindrical surface of the rotor, whereby the centrifugal effect to which the material processed between the plates is subjected is neutralized.

6. A plate extruder as claimed in claim 5 in which each tooth is connected to the front face of the rotor by a concave recessed surface.

7. A plate extruder as claimed in claim 2 in which the frontal face of each tooth is recessed towards the root of the tooth by a concave face which connects it with the front face of the rotor.

8. A plate extruder as claimed in claim 1 in which each tooth is in the form of an incurved, thin-walled spoon.

References Cited

UNITED STATES PATENTS 3,082,476   2/1961   Bunch _____ 18—12C

FOREIGN PATENTS

37/10078   1962   Japan.

J. SPENCER OVERHOLSER, Primary Examiner

U.S. Cl. X.R.

18—12R, 30AF, 30JM

UNITED STATES PATENT OFFICE
CERTIFICATE OF CORRECTION

Patent No. 3,605,186  Dated September 20, 1971

Inventor(s) Claude Wagner

It is certified that error appears in the above-identified patent and that said Letters Patent are hereby corrected as shown below:

Column 5, last line of the table under kg/hr., the numeral "3" should be "31";

Column 6, line 6, correct the spelling of the word "plates"

Signed and sealed this 29th day of February 1972.

(SEAL)
Attest:

EDWARD M. FLETCHER, JR.  ROBERT GOTTSCHALK
Attesting Officer  Commissioner of Patents